United States Patent [19]

Watson

[11] Patent Number: 4,594,125
[45] Date of Patent: Jun. 10, 1986

[54] APPARATUS FOR MAKING LAMINATED LABELS

[76] Inventor: Douglas M. Watson, 3684 Forrest Park Blvd., St. Louis, Mo. 63108

[21] Appl. No.: 588,391

[22] Filed: Mar. 12, 1984

[51] Int. Cl.⁴ .............................................. B32B 31/12
[52] U.S. Cl. ..................................... 156/516; 156/248; 156/267; 156/268; 156/270; 156/522; 156/552; 156/570
[58] Field of Search ............... 156/230, 239, 248, 267, 156/268, 270, 516, 522, 552, 570

[56] References Cited

U.S. PATENT DOCUMENTS

| | | | |
|---|---|---|---|
| 1,944,282 | 1/1934 | Snyder | 156/268 |
| 2,050,382 | 8/1936 | Rowbotham et al. | 156/324 |
| 2,154,474 | 4/1939 | Scott | 156/516 |
| 2,425,805 | 8/1947 | Hyman | 156/324 |
| 2,629,423 | 2/1953 | Loeser | 156/552 |
| 2,759,523 | 8/1956 | Goldstein et al. | 156/268 |
| 3,413,171 | 11/1968 | Hannon | 156/277 |
| 3,639,194 | 2/1972 | Plunkett et al. | 156/552 |
| 3,784,430 | 1/1974 | Gilbert et al. | 156/324 |
| 4,333,784 | 6/1982 | McCarthy | 156/252 |
| 4,359,358 | 11/1982 | Hattemer | 156/248 |

Primary Examiner—Caleb Weston
Attorney, Agent, or Firm—Senniger, Powers, Leavitt and Roedel

[57] ABSTRACT

Apparatus for and method of making, among other things, layered labels of the type comprising a central substrate layer of printable material disposed between first and second clear cover layers, and a backing layer.

8 Claims, 11 Drawing Figures

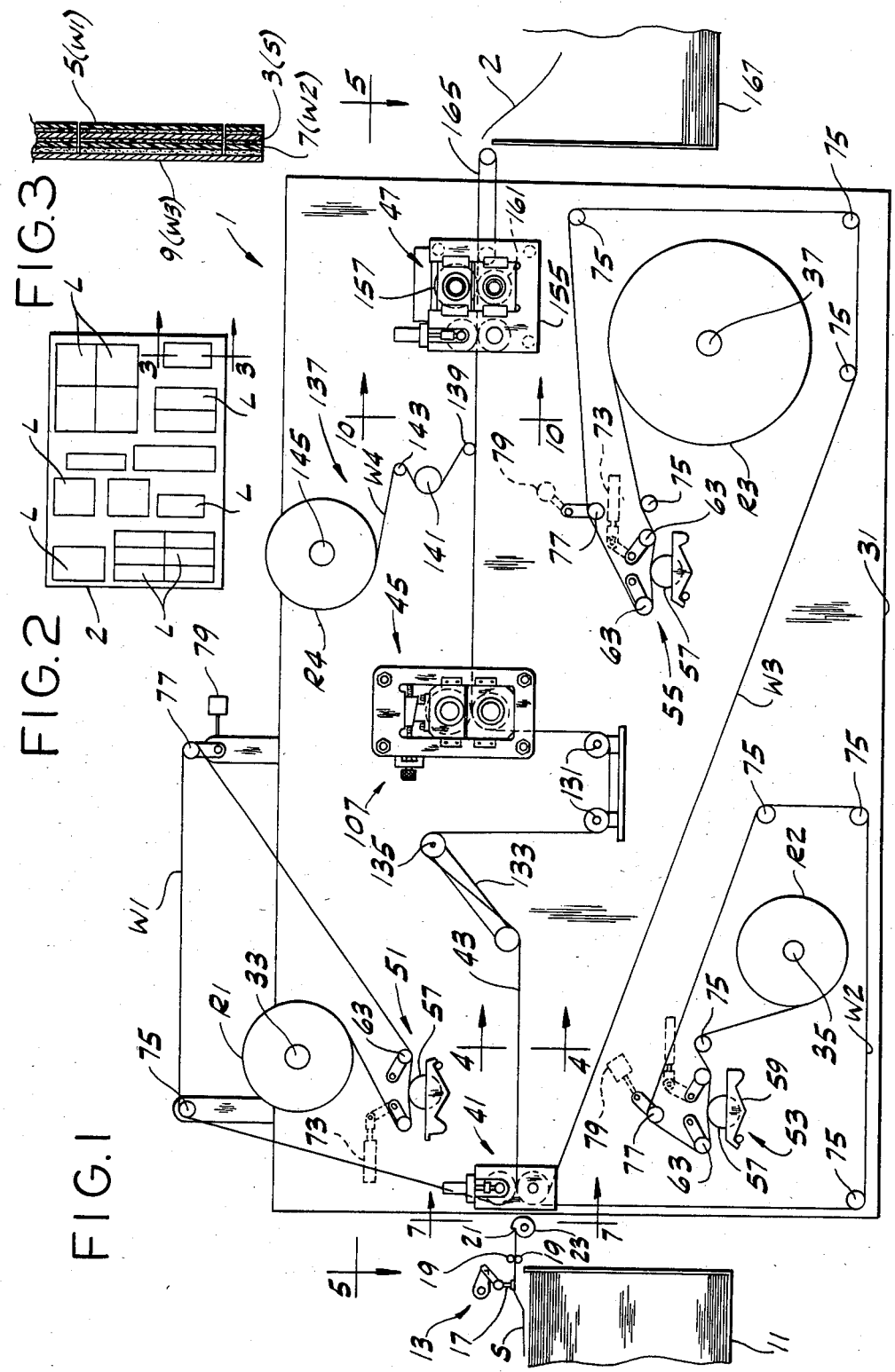

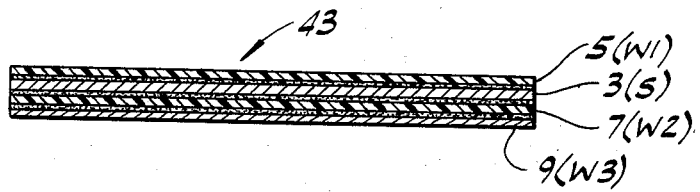
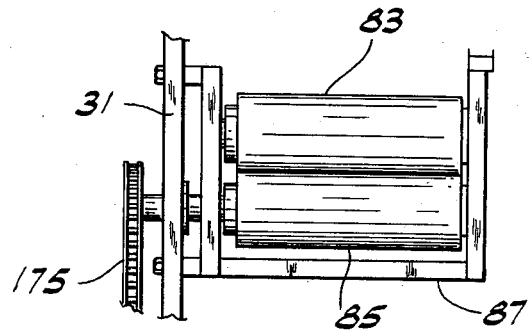
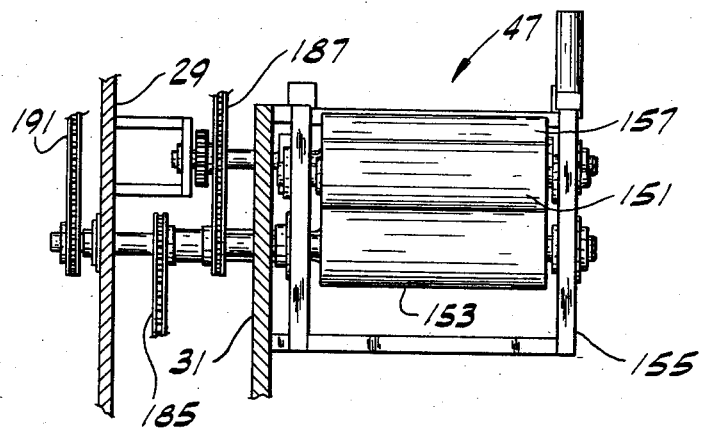

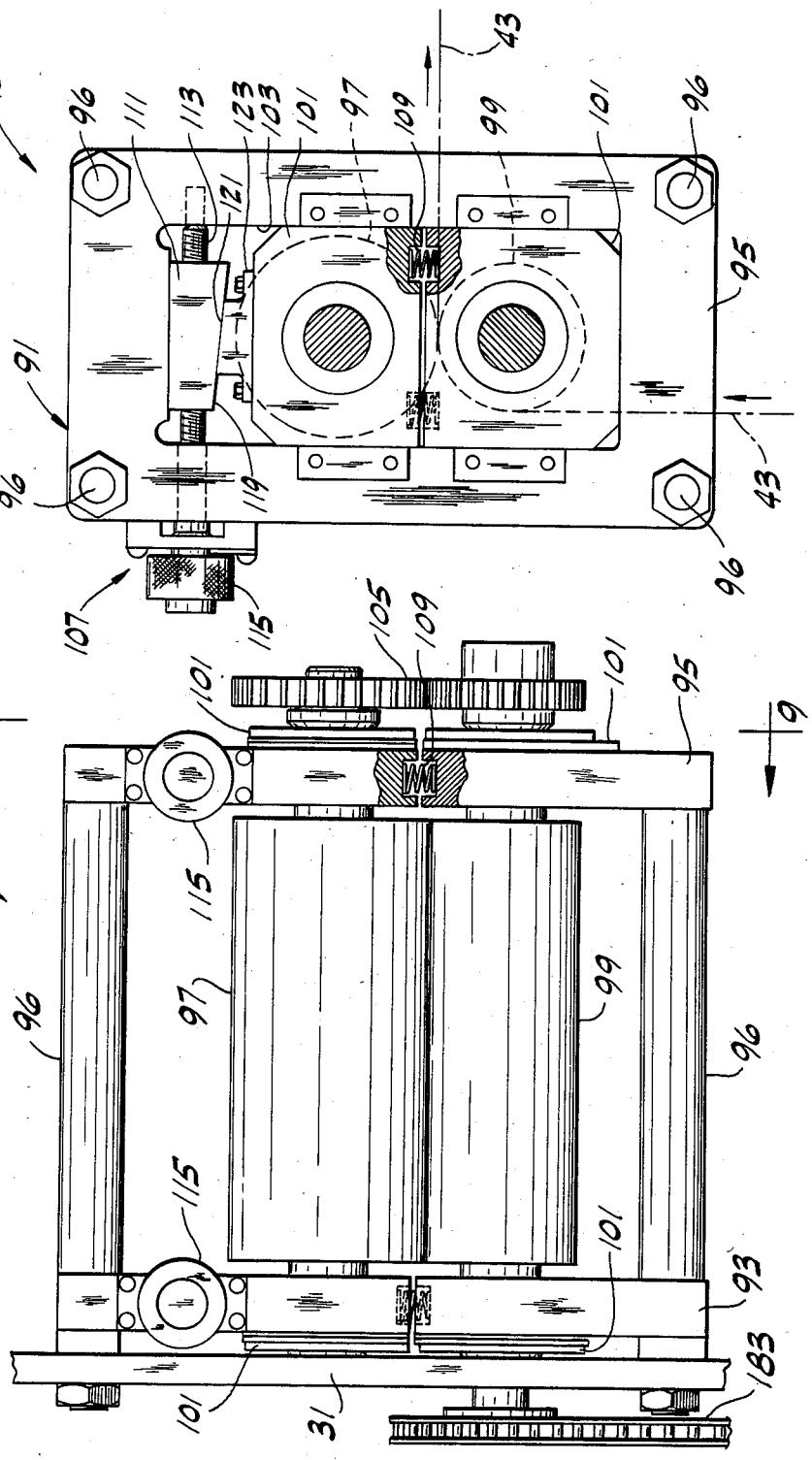

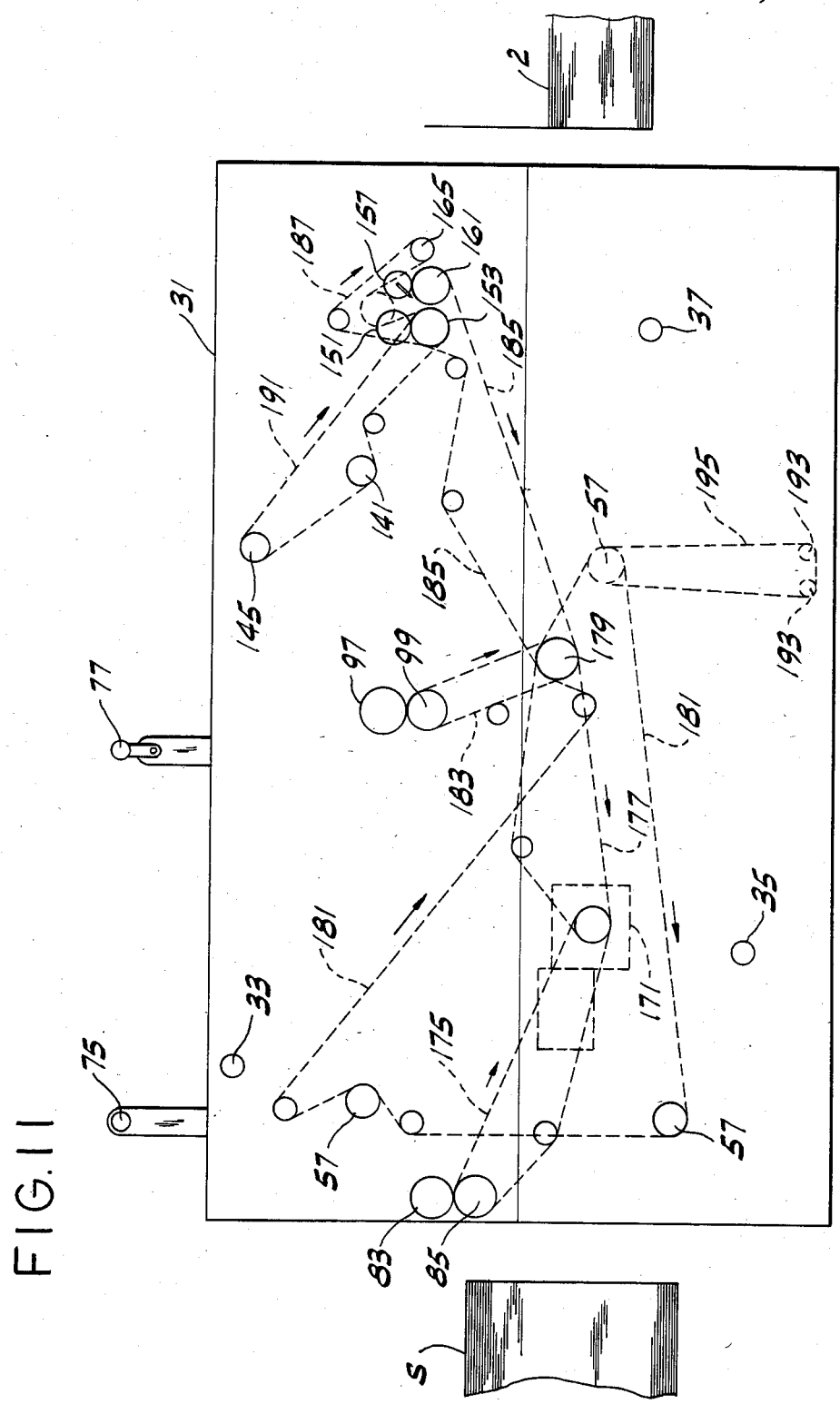

APPARATUS FOR MAKING LAMINATED LABELS

BACKGROUND OF THE INVENTION

This invention relates generally to label-making apparatus and method, and, more particularly, to apparatus for and a method of making layered laminated labels primarily of the type comprising a central layer of printable substrate material disposed between first and second cover layers, and a peel-off backing layer.

Laminated labels of the type described above are advantageous in that a durable yet inexpensive label may be made by sandwiching a printable substrate of relatively inexpensive material between clear cover layers of a suitable plastic, thereby avoiding the use of vinyl, for example, which is typically used as a substrate and which is considerably more expensive.

SUMMARY OF THE INVENTION

Among the several objects of this invention may be noted the provision of apparatus for and a method of making a laminated label of the type described hereinabove; the provision of such apparatus which is versatile for making various types of laminated labels in addition to the type described above; the provision of such apparatus and method which do not require the use of pre-glued stock layer material; the provision of such apparatus and method which permit the application of different types of glues to different layers of the label; and the provision of such apparatus which is fully automated for operation by a single person.

Generally, apparatus of the present invention for making laminated labels of the above-mentioned type comprises means for holding a supply of substrate material, means for feeding substrate material from said holding means in a forward direction for travel along a path through the apparatus, means for rotatably mounting a first supply roll of web material corresponding to the first cover layer, means for rotably mounting a second supply roll of web material corresponding to the second cover layer, means for rotatably mounting a third supply roll of web material corresponding to the backing layer, first glue-applicator means for applying glue to one face, constituting the inside face, of web material pulled from the first supply roll, second glue-applicator means for applying glue to one face, constituting the inside face, of web material pulled from the second supply roll, and third glue-applicator means for applying glue to one face, constituting the inside face, of web material pulled from the third supply roll. The apparatus further comprises means for combining said substrate and web materials as the substrate material is fed forwardly and as the web materials are pulled from respective first, second and third supply rolls to form a laminated strip of label material. The combining means is adapted to bring the inside glue-bearing faces of web material pulled from the first and second supply rolls into face-to-face contact with opposite faces of the substrate material to form the cover layers, and to bring the inside glue-bearing face of web material pulled from the third supply roll into face-to-face contact with the outside face of one of the cover layers to form the backing layer. Die cutting means is provided downstream from said combining means for cutting through the substrate and cover layers of the laminated strip to form individual labels on the backing layer.

A method of the present invention for making labels comprises the steps of feeding substrate material in a forward direction along a path leading to a die cutting station, pulling three webs of web material from three different supply rolls as said substrate material is fed forwardly, applying glue to one face, constituting the inside face, of each web pulled from its respective supply roll, simultaneously combining the substrate material and the three webs as the substrate material moves forwardly along said path and as said webs are pulled from respective supply rolls to form a laminated strip of label material, said combining step comprising applying two of the three webs, constituting cover webs, to opposite faces of the substrate material with the glue-bearing inside faces of the cover webs in face-to-face contact with the outside faces of the substrate material, and applying the third web, constituting a backing web, to the outside face of one of the cover webs with the glue-bearing inside face of the third web in face-to-face contact with said one cover web, and die cutting through the cover webs and substrate material of the laminated strip as the laminated strip is fed forwardly to form individual labels on the backing web.

Other objects and features will be in part apparent and in part pointed out hereinafter.

BRIEF DESCRIPTION OF THE DRAWINGS

FIG. 1 is a side elevation of label-making apparatus of the present invention;

FIG. 2 is a plan of a sheet of labels made by the apparatus of FIG. 1;

FIG. 3 is an enlarged section on line 3—3 of FIG. 2;

FIG. 4 is an enlarged vertical section on line 4—4 of FIG. 1;

FIG. 7 is an enlarged vertical section in line 7—7 of FIG. 1;

FIG. 8 is a front elevation of die-cutting apparatus of FIG. 1;

FIG. 9 is a vertical section on line 9—9 of FIG. 8;

FIG. 10 is an enlarged vertical section on line 10—10 of FIG. 1; and

FIG. 11 is a schematic elevational view illustrating a chain drive mechanism of the apparatus.

Corresponding reference characters indicate corresponding parts throughout the several views of the drawings.

DESCRIPTION OF THE PREFERRED EMBODIMENT

Figure 5:
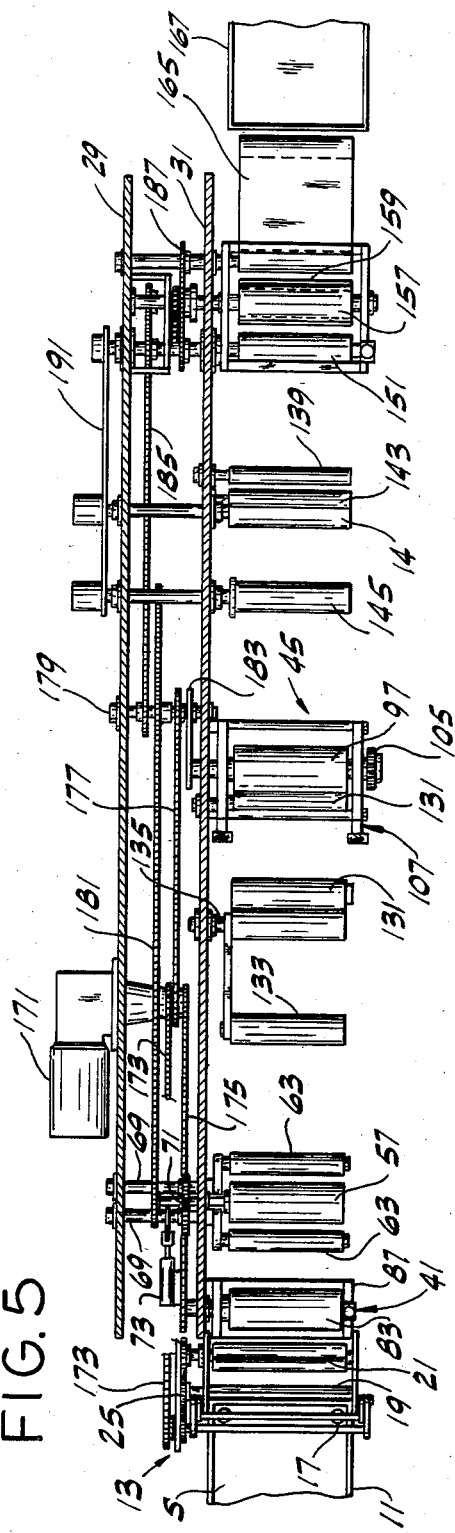
FIG. 5 is a horizontal section on line 5—5 of FIG. 1 with web material removed for clarity.

Referring now to the drawings, and first more particularly to FIGS. 1-3, there is generally indicated at 1 apparatus of the present invention for making sheets 2 of laminated labels L. Apparatus 1 is especially (albeit not exclusively) adapted for making labels of the type comprising a central substrate layer 3 of a printable relatively inexpensive material (e.g., paper) disposed between first (upper) and second (lower) cover layers designated 5 and 7, respectively, of clear plastic film and a pressure-sensitive peel-off backing layer 9 of suitable backing material (see FIG. 3).

Apparatus 1 comprises means 11 for holding a supply of substrate material for use in forming substrate layer 3 and means generally designated 13 for feeding the substrate material from holding means 11 in a forward direction (from left to right as viewed in FIG. 1) for travel along a path through apparatus 1. The substrate material 3 may be constituted, for example, by a stack of 17"×11" or 8½"×11" sheets S of chosen substrate, and feeding means 13 may be a vacuum-grip feeder mechanism comprising a pair of sucker arms 17 operable for feeding individual sheets S lengthwise one after another at a uniform rate from the top of the stack to the nip of a pair of relatively small-diameter rollers 19, the latter of which are operable for feeding the sheets forwardly along the aforementioned path. The sheets are "squared-up" relative to their direction of feed by impacting against a shoulder 21 of a rotary cam 23 located downstream from the feed rollers 19. The movements of the sucker arms 17, feed rollers 19 and rotary cam 23 are synchronized with respect to one another by suitable gearing 25.

Apparatus 1 also includes a pair of spaced-apart generally parallel vertical mounting plates or panels 29, 31 on which various component parts of the apparatus are mounted. These include a roller 33 for rotatably mounting a first supply roll R1 of web material W1 corresponding to cover layer 5, a roller 35 for rotatably mounting a second supply roll R2 of web material W2 corresponding to cover layer 7, and a roller 37 for rotatably mounting a third supply roll R3 of web material W3 corresponding to backing layer 9. The rollers 33, 35, 37 extend generally horizontally laterally outwardly from mounting panel 31 in cantilever fashion, the inner ends of the rollers being journalled in suitable bearings (not shown) fastened to the panel. Other parts of apparatus 1 include means generally designated 41 for combining the substrate and web materials S, W1, W2, W3 (as the substrate material is fed forwardly by feeding mechanism 13 and as the web materials are pulled from respective first, second and third supply rolls R1, R2 and R3) to form a laminated or composite strip 43 of label material having the cross-sectional configuration shown in FIG. 4, die cutting means generally indicated at 45 downstream from combining means 41 for cutting through the substrate and cover layers S, W1, W2 of the laminated strip 43 thereby to form individual labels L on the backing strip 9, and sheeter means generally designated 47 downstream from the die cutting means 45 for cutting the laminated strip into individual sheets 2 of labels.

Figure 6:
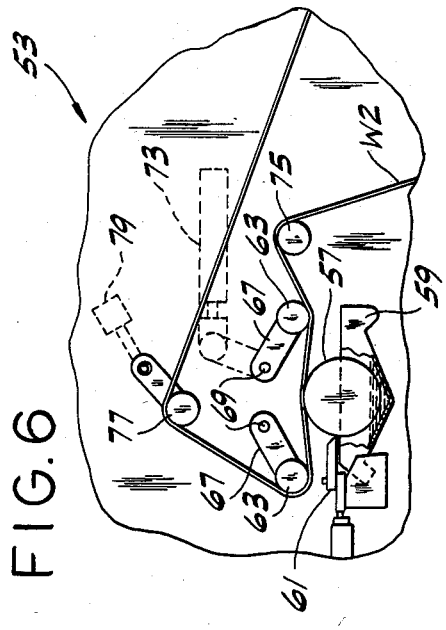
FIG. 6 is an enlarged portion of FIG. 1 showing glue-applicator means.

Indicated generally at 51, 53 and 55, respectively, are first, second and third glue-applicator means for separately applying glue to the inside faces (i.e., inside with respect to the laminated strip 43) of web materials W1, W2, W3 pulled from respective first, second and third supply rolls R1, R2 and R3. As shown in FIG. 6 each glue-applicator means comprises a glue roll 57 engageable with respective web material as the web material is pulled therepast for applying glue to the inside face of the web material. The glue roll is preferably rotatable about a generally horizontal axis in a direction opposite the direction of web travel, although it will be understood that this is not critical to the present invention. The glue roll 57 is journalled in a bearing (not shown) affixed to panel 31 and extends in cantilever fashion outwardly therefrom. Each glue-apparatus means also includes a conventional glue tray 59 for holding a supply of glue, and conventional doctor blade assembly 61 for applying glue in metered fashion to the outer surface of the glue roll. A pair of rollers, each designated 63, extend generally parallel to each glue roll at locations immediately upstream and downstream from the glue roll and are engageable with the outside (upper as viewed in FIG. 6) face of the web material pulled from a respective supply roll. These rollers 63 are mounted on crank arms 67 rigidly connected to shafts 69 journalled in panels 29 and 31. The shafts 69 are connected via gearing 71 for conjoint rotation by a cylinder 73, the latter being retractible to swing the rollers 63 to a first position (shown in FIG. 7) for moving the inside face of the web material against a respective glue roll, and extensible to swing the rollers 63 to a second position wherein the web material is not in contact with the glue roll. The cylinders 73 of the three glue-applicator means 51, 53, 55 are connected via suitable means (not shown) for operation in unison. The web material pulled from each supply roll R1, R2, R3 is directed through a respective glue-applicator means to combining means 41 by a plurality of idler rolls, each designated 75, and by a tensioning roll 77 pivotally mounted with respect to panel 31 and biased toward a web-tensioning position by a suitable tensioning weight 79, as will be understood by those skilled in this art. It is contemplated that other types of glue-applicator means may also be used without departing from the scope of this invention.

Combining means 41 comprises upper and lower combining rolls, designated 83 and 85 in FIG. 7, respectively, mounted for rotation about parallel generally horizontal axes immediately forward of (downstream from) the feeding mechanism 13 in a position to receive the substrate material therebetween as it is fed forwardly by the feeding mechanism. The rolls 83, 85 are adapted to bring the inside glue-bearing surfaces of web material W1 and W2 pulled from supply rolls R1 and R2 into face-to-face contact with opposite (upper and lower) faces of the substrate material S to form the above-mentioned cover layers 5 and 7, and to bring the inside glue-bearing surface of web material W3 pulled from supply roll R3 into face-to-face contact with the outside (lower) face of cover layer 7 to form the aforementioned backing layer 9. The ends of the combining rolls 83, 85 are journalled in suitable bearing blocks carried by an undercarriage 87 fastened to panel 31 in the manner shown in FIG. 7. The lower roll 85 is driven by appropriate means which will be described in more detail hereinafter. The upper combining roll 83 is preferably vertically movable relation to the lower roll 85 between an open position in which the rolls are gapped to facilitate initial threading of the substrate and web materials therebetween, and a closed position in which the rolls are adapted for pressure engagement with the substrate and web materials for drawing them forward and combining them.

As illustrated best in FIGS. 8 and 9, die cutting means 45 comprises a frame, generally designated 91, having a pair of side frame members at opposite sides of the frame constituted by two spaced-apart vertical plates 93, 95 connected by tie rods 96 fastened at their inner ends to mounting panel 31. Means 45 further comprises die and anvil rolls indicated at 97 and 99, respectively, each having a generally cylindric outer surface and each being mounted to extend between the side frame members 93, 95 for rotation about a generally horizontal axis generally perpendicular to the direction of travel of the laminated strip 43, the latter of which is adapted to pass between the nip of the die and anvil rolls 97, 99. The die roll 97 may be a standard die roll suitably engraved, for example, to cut the labels of the desired configuration in the laminated strip 43. In the embodiment shown, the die and anvil rolls are rotatable about their respective axes with their cylindric surfaces so spaced with respect to one another that when the laminated strip passes therebetween the die roll is adapted for cutting completely through the substrate and cover layers 3, 5 and 7, but not the backing layer 9, to form individual labels L on the backing layer. The die and anvil rolls are journalled in bearing blocks 101 slidable in vertical guideways 103 constituted by rectangular openings in the side frame members 93, 95 and are connected for conjoint rotation by gearing 105. The anvil roll 99 is driven in a manner which will be discussed in more detail below.

In accordance with the present invention, wedge means generally indicated at 107 is provided for adjusting the spacing (the nip) between the die and anvil rolls 97, 99 according to the thickness of the laminated strip 43. Wedge means 107 is operable in cooperation with suitable springs 109 which bias the two rolls 97, 99 apart. Means 107 comprises a pair of wedge members 111 of generally rectangular-section bar stock threaded on horizontal screw shafts 113 at the upper ends of the guideways 103 in the two side frame members 93, 95, the upper faces of the wedge members 111 being engageable with respective side frame members. The screw shafts 113 are rotatable via knurled knobs 115 on their axes for moving the wedge members relative to the shafts in a direction which is generally parallel to the direction of travel of the laminated strip 43 between the die and anvil rolls. Each wedge member has an inclined lower surface 119 engageble with a complementary inclined surface 121 on a cam member 123 fastened to the top of a respective bearing block 101 in a respective guideway 103. Thus, the screw shafts 113 are rotatable in one direction to move the wedge members 111 in a corresponding direction (toward the left as viewed in FIG. 9) for forcing the die roll downwardly against the bias of springs 109 thereby to decrease the spacing between the die and anvil rolls, and in the opposite direction to move the wedge members 111 in the opposite direction thereby to permit the die roll to move upwardly under the urging of springs 109 thereby to increase the spacing between the rolls.

In circumstances where it is desireable to die cut the backing layer 9 at selected intervals (to facilitate label peel-off, for example), a second die cutting station (not shown) may be provided immediately downstream from the first (45). The second die cutting station would be identical to the first except for the engraving on the die roll and the vertical orientation of the die and anvil rolls, which would be reversed with respect to one another.

A pair of centering rolls 131 pivotally mounted at their inner ends on mounting panel 31 immediately upstream from die cutting means 45 centers the laminated strip 43 in the transverse direction with respect to the die and anvil rolls 97, 99 so that the strip passes between the rolls in precise position. A compensator 133 of conventional design is pivoted at 135 to panel 31 and is swingable on the panel for adjusting the amount (length) of laminated strip 43 between the combining rolls 83, 85 and die cutting means 45 to advance or retard the position of die cut longitudinally with respect to the strip 43.

Means generally indicated at 137 is provided downstream from die cutting means 45 for stripping a web W4 of scrap material (sometimes referred to in the trade as the "matrix") from the laminated strip 43 and taking it up, such scrap being constituted by those portions of the substrate and cover layers 3, 5 and 7 between the labels die cut in the strip. Means 137 comprises a knurled separator roll 139, a friction roll 141 having a friction-grip outer cylindric surface, an idler roll 143, and a take-up roll R4 of web material W4 rotatably mounted on a take-up roller 145.

Laminated strip 43 is pulled from die cutting means 45 to sheeter means 47 by upper and lower power rollers 151, 153 mounted on an undercarriage 155 fastened to panel 31, as shown in FIG. 10. The upper power roller 151 is preferably vertically movable relative to the lower roller 153 between an open position in which the rollers are spaced apart to facilitate initial threading of the laminated strip 43 therebetween, and a closed position in which the rollers are engageable with the strip for drawing it forward.

Sheeter means 47 comprises a rotary shear roll 157 having a blade 159 extending axially on its outer surface, and a back-up roll 161, the ends of both rolls being suitably journalled in opposing side plates of undercarriage 155 immediately downstream from the power rollers 151, 153. The rotary shear roll 157 is rotatable on its axis to bring blade 159 into engagement with the laminated strip 43 to cut tranversely through the strip at intervals spaced longitudinally of the strip to cut the strip into individual sheets 2 of labels L. As will appear, the feeding mechanism 13, the die cutting means 45, and the rotary shear and back up rolls 157, 161, are synchronized for insuring that the strip 43 is die cut in proper registration with substrate 3 (e.g., sheets S) and the strip 43 then cut at precise intervals (e.g., between successive sheets S of substrate material). The rotary shear roll 157 is also preferably vertically movable relative to the back-up roll 161 between an open position for facilitating initial threading of the laminated strip 43 therebetween, and a closed position in which it is operative for cutting the strip into individual sheets. An endless belt conveyor 165 adjacent the downstream end of sheeter means 47 catches sheets 2 cut from strip 43 and conveys them forwardly for drop-off into an output tray 167.

As shown in FIGS. 5 and 11, various components of apparatus 1 are powered by a motor 171 mounted on panel 29. The output shaft of this motor has a first chain-and-sprocket connection 173 with gearing 25 of the feeding mechanism 13, a second chain-and-sprocket connection 175 with the lower combining roll 85, and a third chain-and-sprocket connection 177 with a main take-off shaft 179 journalled in panels 29 and 31. Take-off shaft 179 is drivingly connected to glue rolls 57 via chain 181 (all three glue rolls thus being operable in synchronization), to the anvil roll 99 of die-cutting means 45 via chain 183, and to the lower power roller 153 and back-up roll 161 via chain 185. The lower power roller 153, the rotary shear roll 157 and the endless belt conveyor 165 are interconnected by a chain 187. The lower power roller 153 is also drivingly connected via chain 191 to roll 141 and roller 145 of the scrap stripper and take-up mechanism 137.

Chain-and-sprocket connections 173, 177, 183, 185 and 187 synchronize the rotary shear and back-up rolls 157, 161 with the feeding mechanism 13 and with the die cutting means 45 to ensure that the laminated strip 45 is cut at precise intervals. It is contemplated, however, that the rotary shear and back-up rolls may be adjustable longitudinally with respect to the strip (i.e., in left-to-right direction as viewed in FIG. 1) to provide for further adjustment of where the strip is cut.

Optionally, glue pumps 193 may be provided for pumping glue to the glue trays 59. These pumps 193 may be driven by means of a chain drive connection 195 with the glue roll 57 of glue-applicator means 55.

To operate apparatus 1 web materials W1, W2 and W3 from supply rolls R1, R2 and R3 are threaded through the apparatus in the manner shown in FIG. 1. The die roll 97 is also adjusted with respect to the anvil roll 99 according to the thickness of the laminated strip 43. The glue cylinders 73 are then actuated to swing rollers 63 downwardly to move the inside faces of the webs into contact with respective glue rolls 57.

Upon energization of the motor 171, the combining rolls 83, 85 rotate to pull webs W1, W2 and W3 from respective supply rolls R1, R2 and R3, the inside face of each web being coated with glue by a respective glue roll 57 as the web moves therepast. The feeding mechanism 13 is also operable to feed substrate material (e.g., 17"×11" or 8½"×11" sheets S of stock) forwardly one after another at closely spaced intervals to the nip of the combining rolls. As the substrate and web materials pass between rolls 83 and 85, the latter are adapted to press web W1 (corresponding to cover layer 5) and web W2 (corresponding to cover layer 7) against the upper and lower faces of the substrate with the glue-bearing inside faces of the webs in face-to-face contact with the outside faces of the substrate. The combining rolls 83, 85 are also operable for applying web W3 (corresponding to backing layer 9) to the outside face of web W2 with the glue-bearing inside face of web W3 in face-to-face contact with web W2, the resultant product being laminated strip 43.

Die-cutting means 45 is adapted for pulling the laminated strip 43 forward past the compensator 133 and web centering rolls 31. As the strip 43 passes between the die and anvil rolls 97, 99 the die roll is adapted to cut through the substrate and cover layers 3, 5 and 7, but not the backing layer 9, to form individual labels L on the backing layer 9. If the backing layer 9 is also to be cut, a second die station can be provided immediately downstream from the first station, as noted above.

The die-cut laminated strip 43 is drawn forward from die-cutting means 45 by power rollers 151 and 153. As the strip moves past the separator roll 139, web W4 of scrap or waste material is stripped away from the laminated strip and taken up on take-up roll R4. From the power rollers 151, 153 the laminated strip moves between the rotary shear and back-up rolls 157, 161 which cut the strip into individual sheets. The operation of the rotary shear roll 157 is synchronized with the operation of the feeding mechanism to ensure that the transverse cuts made by blade 159 are between successive sheets S of the substrate material. Individual sheets cut from the laminated strip 2 are conveyed forward to output tray 167 by belt conveyor 165.

Feeding mechanism 13 may be provided with a suitable transmission (not shown) for operation of the mechanism at different speeds to enable sheets of different lengths to be handled. For example, if 8½"-long×11"-wide sheets are to be used as substrate material, the feeding mechanism should be operated at twice the speed at which it operates in handling 17"-long×11"-wide sheets. The speeds at which the various other parts of the apparatus run remain the same no matter what length of substrate material is used.

The apparatus 1 of the present invention is especially concerned with making laminated labels of the type shown in FIG. 4. It will be understood, however, that apparatus 1 is also capable of making other types of laminated labels having less than all the layers shown in FIG. 4.

In view of the above, it will be seen that the several objects of the invention are achieved and other advantageous results attained.

As various changes could be made in the above constructions and method without departing from the scope of the invention, it is intended that all matter contained in the above description or shown in the accompanying drawings shall be interpreted as illustrative and not in a limiting sense.

What is claimed is:

1. Apparatus for making labels of the type comprising a central substrate layer disposed between first and second cover layers, and a backing layer, said apparatus comprising:

means for holding a stack of sheets of substrate material;

means for feeding individual sheets from said stack one after another at a substantially uniform rate in a forward direction for travel along a path through said apparatus with the leading end of one sheet closely adjacent the trailing end of the sheet in front of it;

means for rotatably mounting a first supply roll of web material corresponding to said first cover layer;

means for rotatably mounting a second supply roll of web material corresponding to said second cover layer;

means for rotatably mounting a third supply roll of web material corresponding to said backing layer;

said web material being adapted to be pulled from said first, second and third supply rolls;

first glue-applicator means for applying glue to one face, constituting the inside face, of web material pulled from the first supply roll;

second glue-applicator means for applying glue to one face, constituting the inside face, of web material pulled from the second supply roll;

third glue applicator means for applying glue to one face, constituting the inside face, of web material pulled from the third supply roll;

means downstream from said first, second and third glue-applicator means for combining said sheets and web materials as the sheets are fed forwardly and as the web materials are pulled from respective first, second and third supply rolls to form a laminated strip of label material, said combining means being adapted to bring the inside glue-bearing faces, of web material pulled from said first and said second supply rolls into face-to-face contact with opposite faces of each sheet of substrate material to form said cover layers, and to bring the inside glue-bearing face of web material pulled from said third supply roll into face-to-face contact with the outside face of one of the cover layers to form said backing layer; and die cutting means downstream from said combining means for cutting through said cover layers of said laminated strip thereby to form individual labels on the backing layer.

2. Apparatus as set forth in claim 1 further comprising means for synchronizing the operation of said feeding means and said die cutting means to ensure that a substantially identical pattern of cut is made through each successive sheet of substrate material.

3. Apparatus as set forth in claim 2 further comprising sheeting means downstream from said die cutting means for cutting said laminated strip into individual sheets of labels.

4. Apparatus as set forth in claim 3 further comprising means between said die-cutting means and said sheeting means for pulling from said laminated strip scrap material constituted by portions of said substrate and cover layers between said labels.

5. Apparatus as set forth in claim 3 wherein said sheeting means is synchronized with said feeding means and die cutting means for cutting transversely of said laminated strip between successive sheets of substrate material.

6. Apparatus as set forth in claim 1 wherein each of said first, second and third glue-applicator means comprising a glue roll engageable with respective web material as the web material is pulled thereapast for applying glue to the inside face of the web material.

7. Apparatus as set forth in claim 6 further comprising a pair of rollers associated with each glue roll extending generally parallel to the glue roll at locations immediately upstream and downstream from the glue roll, said rollers being engageable with the outside face of web material pulled from a respective supply roll and being movable between a first position for moving the inside face of the web material into contact with the glue roll, and a second position wherein the web material is not in contact with the glue roll.

8. Apparatus as set forth in claim 7 further comprising a mounting panel, each glue roll and its associated pair of rollers being mounted on said mounting panel with their axes of rotation generally perpendicular to the panel, said roll and associated rollers being supported only at one of their ends, constituting their inner ends, so that the roll and rollers extend outwardly away from the panel in cantilever fashion to facilitate loading of web material from a respective supply roll between the roll and its associated rollers.

* * * * *